United States Patent
Thomas et al.

(10) Patent No.: US 10,312,526 B1
(45) Date of Patent: Jun. 4, 2019

(54) AUTOMATIC PRESSURIZING THERMAL BATTERY

(71) Applicant: Lockheed Martin Corporation, Bethesda, MD (US)

(72) Inventors: Toby D. Thomas, Southlake, TX (US); Thomas E Byrd, Grand Prairie, TX (US); Charles T Fixico, III, Grand Prairie, TX (US); Ralph E. Tate, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1051 days.

(21) Appl. No.: 13/859,414

(22) Filed: Apr. 9, 2013

Related U.S. Application Data

(60) Provisional application No. 61/621,906, filed on Apr. 9, 2012.

(51) Int. Cl.
*H01M 6/00* (2006.01)
*H01M 6/36* (2006.01)

(52) U.S. Cl.
CPC .................................. *H01M 6/36* (2013.01)

(58) Field of Classification Search
CPC .. H01M 10/658; H01M 10/44; H01M 10/615; H01M 10/39; H01M 10/643; H01M 10/659; H01M 10/445; H01M 10/0481; H01M 10/0468; H01M 10/441; H01M 2/10; H01M 2/1094; H01M 2/345; H01M 6/36; H01M 6/50; H01M 6/30

USPC ........................................................... 429/62
See application file for complete search history.

(56) References Cited

U.S. PATENT DOCUMENTS

| | | | |
|---|---|---|---|
| 3,898,101 A | 8/1975 | Bush et al. | |
| 4,041,217 A | 8/1977 | Collins | |
| 5,196,276 A * | 3/1993 | Niksa | H01M 6/50 429/116 |
| 6,187,471 B1 * | 2/2001 | McDermott | H01M 6/32 429/110 |
| 6,308,518 B1 * | 10/2001 | Hunter | F25B 21/02 62/3.3 |
| 6,384,571 B1 | 5/2002 | Velez et al. | |
| 2003/0017387 A1 * | 1/2003 | Marukawa | H01M 2/1077 429/156 |
| 2005/0058887 A1 * | 3/2005 | Richards | H01M 2/0255 429/82 |
| 2007/0128505 A9 * | 6/2007 | Yahnker | B25F 5/008 429/62 |
| 2009/0021106 A1 * | 1/2009 | Baughman | F03G 7/005 310/300 |

* cited by examiner

*Primary Examiner* — Nicholas P D'Aniello
(74) *Attorney, Agent, or Firm* — Withrow & Terranova, PLLC

(57) ABSTRACT

A thermal battery including a casing; a stack of cells disposed within the casing; a pressurizing element; an actuator when actuated, translates the pressurizing element to automatically engage and repressurize the stack of cells; and a latch configured to inhibit movement of the pressurizing element in a direction away from the stack of cells.

16 Claims, 2 Drawing Sheets

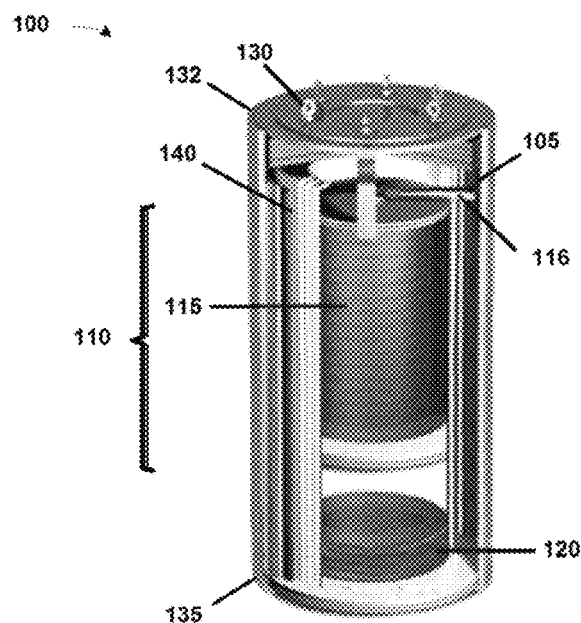
FIG. 1
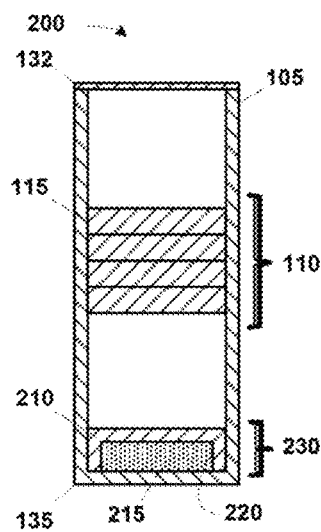 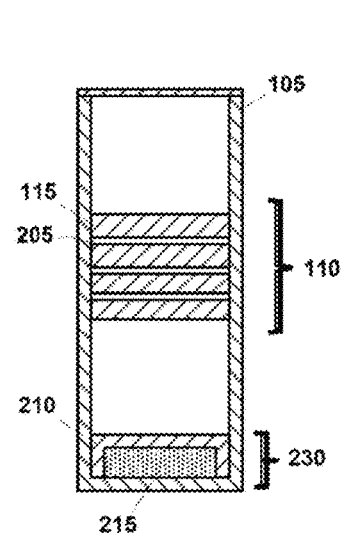 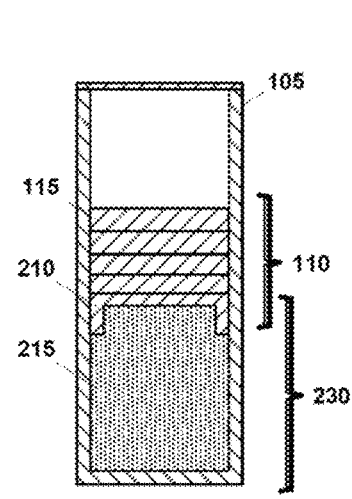
FIG. 2A  FIG. 2B  FIG. 2C

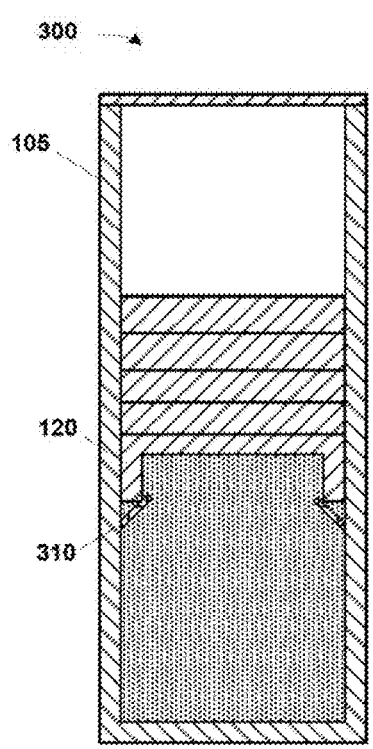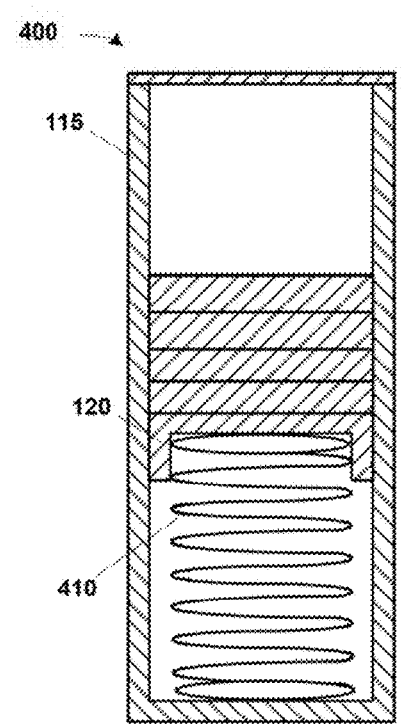

AUTOMATIC PRESSURIZING THERMAL BATTERY

CROSS-REFERENCE TO RELATED APPLICATIONS

The priority of U.S. Provisional Application Ser. No. 61/621,906, entitled Automatic Pressurizing Thermal Battery, and filed Apr. 9, 2012 in the name of the inventors Toby Thomas, et al., is hereby claimed under 35 U.S.C. § 119(e). This application is also hereby incorporated by reference for all purposes as if set forth verbatim herein.

STATEMENT REGARDING FEDERALLY SPONSORED RESEARCH OR DEVELOPMENT

Not applicable.

BACKGROUND

This section introduces information from the art that may be related to or provide context for some aspects of the technique described herein and/or claimed below. As the section's title implies, this information is "background" facilitating a better understanding of that which is disclosed herein. This is a discussion of "related" art. That such art is related in no way implies that it is also "prior" art. The related art may or may not be prior art. The discussion is to be read in this light, and not as admissions of prior art.

One type of battery is known as a thermal battery. A thermal battery typically includes at least one cell. Frequently, they include several cells in a stack. The stack is disposed within a can. The normal manufacturing of a thermal battery utilizes a press and internal shims to set the can header to the right height to weld the case. The press pressurizes the stack to provide what is known as the "stack pressure" and the weld holds the pressure in the thermal battery until the unit is activated.

As a thermal battery is activated the internal stack pressure in the case drops significantly. This drop in pressure adversely effects the reaction which provides the electrical output for the battery. More particularly, thermal batteries with large numbers of cells have issues with holding the pressure on the stack of cells when the battery is activated. The cause of this pressure loss is that as the separator changes phase, it loses some of it volume. This volume loss results in a susceptibility of the stack to vibration and shock and causes a dropout in the voltage.

A variety of thermal battery designs are available to the art, many of which are competent for their intended purposes despite problems such as that discussed above. The art however is always receptive to improvements or alternative means, methods and configurations. Accordingly, the technique disclosed herein should be well received by the art.

SUMMARY

In a first aspect, a thermal battery comprises: a casing; a stack of cells disposed within the casing; a pressurizing element; and an actuator when actuated, translates the pressurizing element to automatically engage and repressurize the stack of cells.

In a second aspect, a thermal battery comprises: a casing; a pressurized stack of cells disposed within the casing; and self-actuated pressurizing element to repressurize the stack of cells with a raise in stack force from within the casing during operation of the battery.

In a third aspect, a thermal battery comprises: a casing; a stack of cells disposed within the casing; a pressurizing element disposed within the casing beneath the stack of cells to raise a stack force of the stack of cells and repressurize the stack of cells when actuated; and means for self-actuating the pressurizing element toward the end of the casing proximal to the cell stack from within casing during operation of the battery.

The above paragraph presents a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The invention may be understood by reference to the following description taken in conjunction with the accompanying drawings, in which like reference numerals identify like elements, and in which:

FIG. 1 is a partially sectioned, elevational view of one particular embodiment:

FIG. 2A-FIG. 2C are conceptualized, sectioned, plan views of a second particular embodiment illustrating the operation of the presently disclosed technique;

FIG. 3 is a conceptualized, sectioned, plan view of a variation on the embodiment of FIG. 2A-FIG. 2C; and FIG. 4 is a conceptualized, sectioned, plan view of another embodiment.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Turning now to the drawings, FIG. 1 depicts in a partially sectioned, elevational view a thermal battery 100 constructed and operated in accordance with the presently disclosed technique. The thermal battery 100 comprises a casing 105 in which is disposed a stack 110 of thermal cells 115. In the embodiments illustrated herein, the casing 105 is cylindrical, but other geometries may be used. Also included in FIG. 1 is a squib, or electric match, 116, by which the thermal battery 100 may be ignited. The thermal battery 100 also includes a plurality of terminals 130 (only one indicated), both positive and negative, on the terminal end 132 opposite the inactive end 135 in conventional fashion.

The thermal battery 100 also includes a plurality of insulation layers 140 (only one indicated). The insulation layers 140 can consist of multiple materials on the sides around the cell stack, such as FIBERFRAX refractory ceramic fiber high temperature insulation products available from Unifrax LLC or other insulating materials such as glass tape, mica, micro-therm and other materials as are known in the art. Additional insulation techniques may provide on the bottom 135 insulation comprising FIBERFRAX discs, stainless steel collectors, heat pellets, Min-k discs and mica. Any suitable insulation technique and material known to the art may be used.

The casing 105, the stack 110, and the individual cells 115 may be designed and constructed in conventional fashion. One departure from this principle is that the casing 105 is extended relative to conventional practice as will be described further below. Thus, those skilled in the art will recognize that their design will be implementation specific in light of considerations and constraints well known in the art. Accordingly, these matters will not be further disclosed for the sake of clarity and so as not to obscure the claimed subject matter.

The thermal battery 100 also comprises, in accordance with the presently disclosed technique, a pressurizing element 120 and an actuator, not shown in FIG. 1. The extension of the casing 105 mentioned above accommodates the pressurizing element 120 and the actuator. The pressurizing element 120 is, in the illustrated embodiment, a piston. The actuator engages the pressurizing element 120 that, when actuated, translates the pressurizing element 120 to automatically engage and repressurize the stack 110 of cells 115. "Automatically" in this particular context means without human intervention. The actuator is not shown in FIG. 1 in light of the variation with which it may be implemented. Specific examples of the actuator will be discussed further below in association with various alternative embodiments.

FIG. 2A-FIG. 2C are conceptualized, sectioned, plan views of a second particular embodiment of thermal battery 200. They also illustrate the operation of the presently disclosed technique with this particular embodiment. Those in the art will readily recognize that these drawings are conceptualized in that they omit some detail common to thermal batteries in the art. One example of such an omitted detail is the squib, or electric match, by which the cells 105 are ignited. This is, again, done for the sake of clarity and so as not to obscure the claimed subject matter.

The casing 105, the stack 110, and the cells 115 (only one indicated) are implemented as discussed above and so like parts bear like numbers. The presently disclosed technique is not limited by the number of cells 115 in the stack 110 and, so, the number shown is for illustrative purposes. However, for reasons that will become apparent from the discussion below, the technique is expected to yield greater benefit from embodiments employing greater numbers of cells 115 over those employing fewer.

FIG. 2A depicts the thermal battery 200 prior to the activation of the cells 115. Note that the cells 115 abut one another within the stack 110. When the cells 115 are actuated, they will lose some of their volume and, as shown in FIG. 2B, separate from one another. The separations 205 (only one indicated) adversely impact the performance of the thermal battery 200. Furthermore, the more separations 205, and the more space they cumulatively occupy, the greater the adverse impact. Hence, the expectation that the benefits of the presently disclosed technique should generally be proportional to the number of cells 115. The presently disclosed technique pressurizes the stack 110 so that the cells 115 abut one another again, as shown in FIG. 2A.

The pressurizing element in this particular embodiment is again a piston 210. The piston 210 is thermally conductive. This will typically affect materials selection to some degree since good thermal conductivity will generally be preferred over poor, all other considerations being equal. Other factors, such as cost, weight, manufacturability, etc. will also come into play in a manner that will be familiar to those in the art having the benefit of this disclosure. In the illustrated embodiment, the piston 210 is metal. Suitable metals include, but are not limited to, Stainless Steel 300 Series or from Duplex Alloys such as Types: 329, 2205, 2304, 2507, 3RE60.

The actuator in this particular embodiment comprises a phase change material 215 disposed within the casing 105 beneath the piston 210. In this context, "beneath", as well as its counterpart "above", are defined relative to the active end 125 thermal battery 100, shown in FIG. 1, at which the terminals 130 are found. Thus, "beneath" indicates that the phase change material 215 is on the side of the piston 210 that is closest to the inactive end 135 of the thermal battery 200. Those in the art having the benefit of this disclosure will appreciate that this physical relationship is an implementation specific detail that may vary across embodiments. For example, some embodiments may place the piston 210 "above" the cells 115 with the phase change material 215 therefore likewise "above" the cells 115. Still other embodiments might include still other physical relationships. The pressurizing element and actuator need only be in a physical proximity to the cells 115 that permits the pressurizing to repressurize, or maintain a pressure, on the cells 115 as taught herein.

The phase change material 215 is, more particularly, disposed in a recess 220 of the piston 210, although this is not necessary in all implementations. Phase change materials are well known to the art and any suitable phase change material may be used. The phase change material 215 in the illustrated embodiment is paraffin. However, other materials may be used. Other suitable phase change materials include hexamine, calcium acetate ($Ca(C_2H_3O_2)_2$), and Napalm B. Considerations in material selection will vary by implementation, but will typically include thermodynamic properties, chemical properties, and economic considerations. For example, the thermodynamic properties should indicate desired performance at the temperatures anticipated to be encountered during operation.

Thus, in the illustrated embodiment, a metal piston 210 is placed below the stack 110 of cells 115 in the thermal battery 200. A block of phase change material 215, such as paraffin is in a void 205 on the bottom of the piston 210. When the thermal battery 200 is activated, the heat from the pyrotechnic core in the battery 200 almost instantly rises above 275 C (527° F.). The heat is conducted through the piston 210. In this particular embodiment, the paraffin vaporizes at 220 C (428° F.) and the pressure of the vapor forces the piston 210 upward pressurizing the cell stack 110. The self-activated, stack force enhancing piston 210 thereby provides the ability to raise the stack force after activation, in turn providing enhanced immunity to structural coupling external environments. This generally results in closing gaps 205 between the cells 115 as shown in FIG. 2C. The thermal battery 200, with its extended outer case 105 and built in piston assembly 230, generally comprising the piston 210 and the phase change material 215, will thereby repressurize the stack 110 when the battery's pyrogen (e.g., phase change material 215) is activated.

In assembly, as disclosed above, the piston 210 will have a recess 225 in the bottom where a block of paraffin will be placed. Paraffin is formed of carbon and hydrogen ($C_{25}H_{52}$). The piston 210 can be inserted in the case without the paraffin touching any other part of the assembly. The piston 210 includes a pressure relief port (not shown) so that it can be seated in the case without pressure building up under the piston 210. Once the piston 210 is seated, a set screw is inserted into and seals the relief port. The outer casing 105 is sealed and pressurized at the factory from the terminal end 132.

On ignition, the internal temperature of the battery 200 will be greater than 300 C. The factory pressurized stack 110 will drop in pressure. The heat will transfer rapidly through the metal body of the piston 210. Paraffin will vaporize at a temperature of 220 C. The vaporized paraffin and the ensuing pressure push the piston 210 up to its stop point. A latch in the stop plate may be used in some embodiments to prevent the piston 210 from retreating. The outer casing 105 is designed to contain the pressure. There will be very little oxygen available to the paraffin vapor to utilize in ignition. However if it ignites, that is acceptable. The outer casing 105 will contain the pressure without it blowing past the piston 210.

As noted above, some embodiments may employ latching mechanism or some other means for maintaining a minimum level within the casing of the battery. One such embodiment is shown in FIG. 3. In FIG. 3, the battery 300 includes a latch 310 that, in this particular embodiment, is actuated by gravity. The latch 310 that folds against the casing 105 as the pressurizing element 120 travels upwardly and, when the pressurizing element 120 travels past it, folds down. The latch 310 may comprise a plurality of segments hinged at the lower end thereof, for example. Alternative mechanisms may be used in alternative embodiments. For example, the latch 310 may be spring loaded in some embodiments.

The presently disclosed technique admits wide variation in the means by which the pressurizing element may be translated. The heated phase change material approach described above is but one means. Other embodiments such as the battery 400 in FIG. 4, may employ a mechanical means, such as a spring 410 operating against pressure above the pressurizing element 120. The spring 410, shown in FIG. 1, and the phase change material 215 are, by way of example and illustration, but two means by which the pressurizing element 120 may be translated. Still other embodiments may employ alternative means including equivalent structures that perform the translating function, including other means besides a spring for mechanically translating the pressurizing element 120. Still other means for urging the pressuring element 120 toward the end of the casing 105 proximal the cell stack 110 from within the casing 105 alternative to those disclosed herein may also be used in still other embodiments.

The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

The following US patents are hereby incorporated by reference as if set forth verbatim herein for purposes of disclosing the construction and operation of conventional thermal batteries that may be modified as described above to implement the technique disclosed herein:

U.S. Pat. No. 3,898,101, entitled "Thermal Battery", and issued Aug. 5, 1975, to the United States of America as assignee of the inventors Donald M. Bush and Donald A. Nissen.

U.S. Pat. No. 4,041,217, entitled "Thermal Battery With Metal-Metal Oxide Heating Composition", and issued Aug. 9, 1977, to Catalyst Research Corporation as assignee of the inventor William H. Collins.

U.S. Pat. No. 6,384,571, entitled "Method of Recharging a Pyrotechnically Actuated Thermal Battery", and issued May 7, 2002, to Lockheed Martin Corporation as assignee of the inventors Thomas A. Velez and Nicholas Shuster.

To the extent there is any conflict between any incorporated reference and the present disclosure, the present disclosure controls the conflict.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A thermal battery, comprising:
   a casing;
   a stack of cells disposed within the casing;
   a pressurizing element disposed in the casing, the pressurizing element being thermally conductive; and
   an actuator comprising a phase change material disposed in the casing, the actuator configured to urge the pressurizing element against an end of the stack of cells to translate the end and decrease a length of the stack of cells when heated above a phase change temperature of the phase change material,
   wherein the pressurizing element is positioned between the stack of cells and the actuator;
   wherein the actuator is configured to be activated by an increase in temperature within the thermal battery above the phase change temperature from heat conducted from the stack of cells through the pressurizing element.

2. The thermal battery of claim 1, wherein the pressurizing element is disposed within the casing beneath the stack of cells; and
   the actuator is configured to urge the pressurizing element toward the stack of cells to impart a force on the stack of cells in a direction of translation of the pressurizing element and repressurize the stack of cells.

3. The thermal battery claim 1, wherein the phase change material comprises paraffin, hexamine, calcium acetate, or Napalm B.

4. The thermal battery of claim 1, wherein the pressurizing element comprises a piston having a planar end member, a sidewall that extends perpendicularly with respect to the planar end member, the planar end member and the sidewall forming a chamber, wherein the actuator is positioned within the chamber.

5. The thermal battery of claim 4, wherein the casing comprises a cylindrical shape.

6. The thermal battery of claim 5, wherein the sidewall comprises a cylindrical shape having an exterior surface that fits against an interior surface of the casing.

7. The thermal battery of claim 1, wherein the actuator is configured to actuate after the thermal battery has been ignited.

8. The thermal battery of claim 7, wherein the phase change material comprises a solid at an ambient temperature and a fluid at an operating temperature of the battery.

9. The thermal battery of claim 8, wherein the phase change material comprises a gas at the operating temperature of the battery.

10. A thermal battery, comprising:
a casing enclosing a chamber;
a cell stack comprising a plurality of cells disposed within a first portion of the chamber, the plurality of cells in contact with one another at a pre-ignition state of the thermal battery;
a pressurizing element disposed in a second portion of the chamber; and
an actuator comprising a phase change material disposed in the second portion of the chamber and configured to urge the pressurizing element against an end of the cell stack to translate the end and decrease a length of the stack of cells when heated above a phase change temperature of the phase change material,
wherein the pressurizing element is positioned between the stack of cells and the actuator;
wherein the actuator is configured to be activated by an increase in temperature within the thermal battery above the phase change temperature from heat conducted from the stack of cells through the pressurizing element.

11. The thermal battery of claim 10, wherein the pressurizing element comprises a piston forming a piston chamber, and wherein the actuator is at least partially disposed within the piston chamber.

12. The thermal battery of claim 10, wherein the actuator comprises a phase change material configured to have a first phase at the pre-ignition state of the thermal battery and a second phase at a post-ignition state of the thermal battery.

13. The thermal battery of claim 1, further comprising a latch configured to, after movement of the pressurizing element in a direction toward the stack of cells, inhibit movement of the pressurizing element in a direction away from the stack of cells.

14. The thermal battery of claim 13, wherein in an unlatched position the latch folds against the casing and is configured to move into a latched position after the pressurizing element has moved past the latch.

15. The thermal battery of claim 10, further comprising a latch configured to, after movement of the pressurizing element in a direction toward the cell stack, inhibit movement of the pressurizing element in a direction away from the cell stack.

16. A thermal battery, comprising:
a casing;
a stack of cells disposed within the casing, the stack of cells comprising a first end and a second end;
an actuator comprising a phase change material disposed within the casing; and
a pressurizing element disposed within the casing and positioned between the stack of cells and the actuator;
wherein the actuator is configured to receive heat conducted from the stack of cells to increase a temperature of the actuator above a phase change temperature of the phase change material to urge the pressurizing element against the first end of the stack of cells to impart a force on the first end of the stack of cells toward the second end of the stack of cells to decrease a length of the stack of cells and repressurize the stack of cells.

* * * * *